Jan. 16, 1951 R. W. ASKINS 2,538,493
TRAILER HITCH
Filed Feb. 21, 1946 2 Sheets-Sheet 1
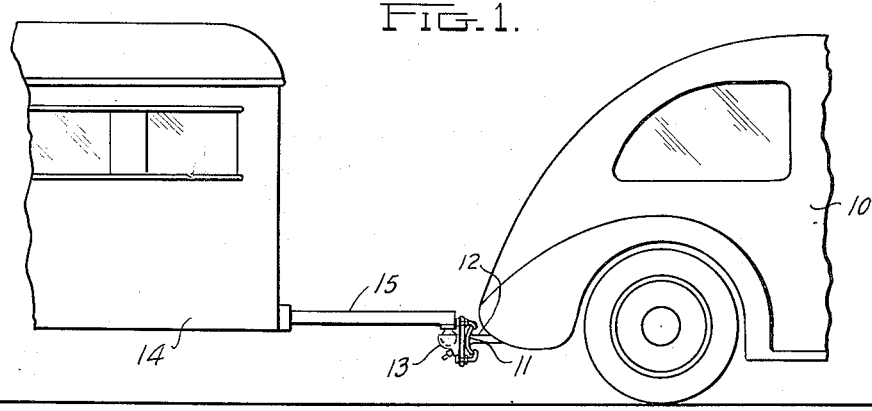
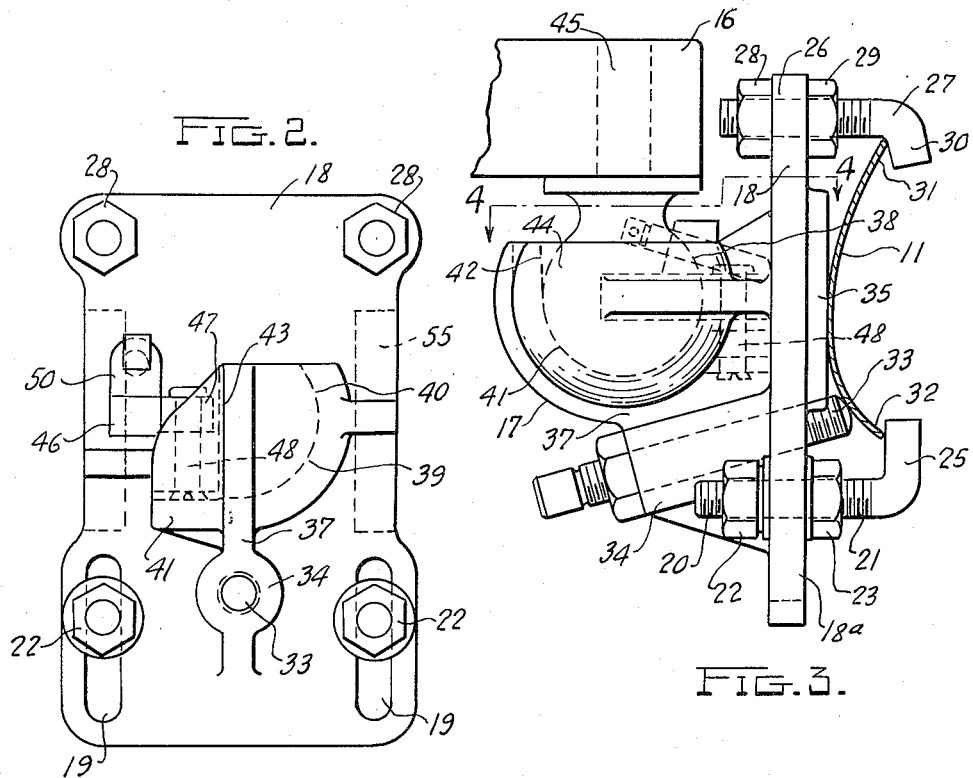
INVENTOR.
Ralph W. Askins
BY
Malcolm W. Fraser
ATTORNEY

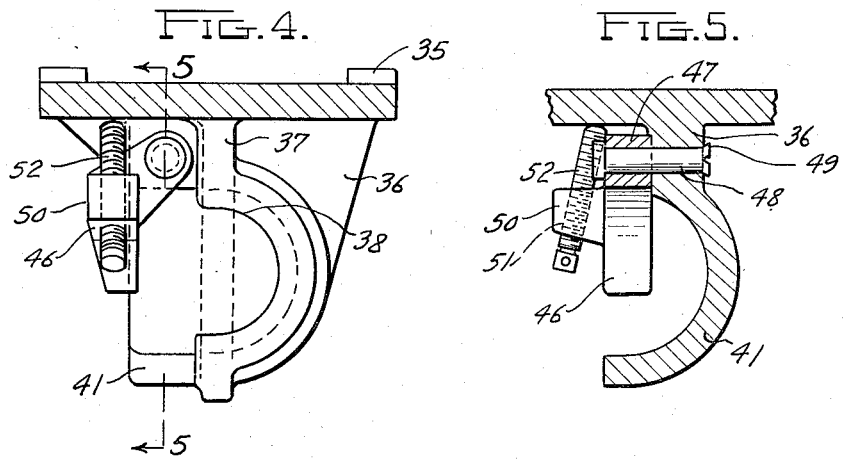
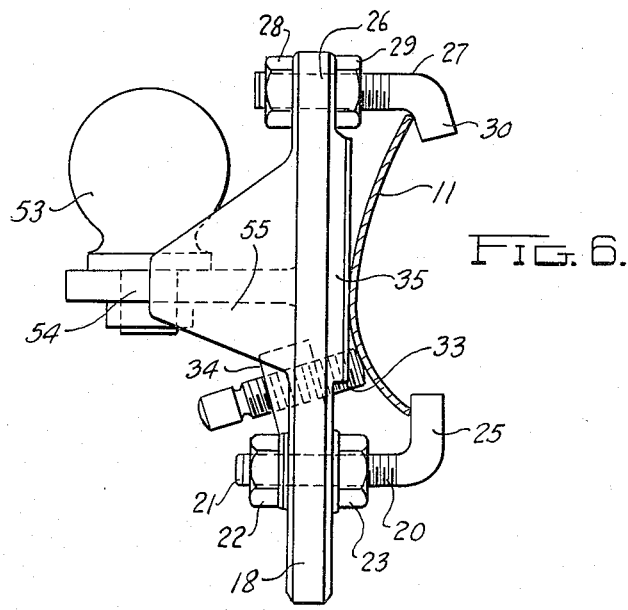
INVENTOR.
Ralph W. Askins
BY Malcolm W. Fraser
ATTORNEY

Patented Jan. 16, 1951

2,538,493

UNITED STATES PATENT OFFICE 2,538,493

TRAILER HITCH

Ralph W. Askins, Toledo, Ohio

Application February 21, 1946, Serial No. 649,134

9 Claims. (Cl. 280—33.44)

This invention relates to couplings and particularly to vehicle couplings adapted for interconnecting a trailer to an automobile or the like.

An object of this invention is to produce a new and improved vehicle coupling having novel features of construction enabling same to be easily adjusted for use in connection with variously shaped vehicle plate or bumper members. The attachments and disconnections of the coupling to the vehicle made subsequent to the initial adjustment being simplified thereby to encourage removal thereof which not only prolongs the life and use of the coupling, but also, decreasing parking hazards or the like.

Another object of this invention is to produce a new and improved vehicle coupling having novel means of operation enabling construction of simplified structure whereby the coupling members may be produced by simplified low cost casting or stamping processes for use with specific vehicle models.

A further object of this invention is to produce an improved vehicle coupling of the ball and socket type, the more complicated and expensive socket member forming a part of the vehicle connection of which considerably less in number are used than the trailer tongue attachments. Novel positioning means are provided expeditiously to aid the assembly to the normal draft position in which they are effectively locked during operation.

A still further object is to provide an improved ball and socket coupling in which the normal operating forces are aligned through the center of the associated ball and socket members to provide a more durable unit. Novel locking means are provided for securing said elements in the connected and aligned position.

A still further object is to produce an improved coupling of the type described which may be easily and quickly mounted or dismounted on the hauling vehicle, efficiently and simply engaged or disengaged in the assembled draft relation, and which may be securely and accurately locked in the assembled position.

A still further object of this invention is to provide a novel one-piece mounting member having spaced hooks providing a positioning means in connection with panels, plates, spaced rims or the like, the same being held in the mounted relation by restricting retrograde movement of the member to the disengageable position.

A still further object is to provide a coupling mounting for use in combination with plates having spaced edge portions available for attachment purposes.

Other objects and advantages of the invention will hereinafter appear, and for purposes of illustration but not of limitation, an embodiment of the invention is shown in the accompanying drawings in which:

Figure 1 is a schematic drawing showing fragmentary portions of a vehicle and trailer interconnected by a coupling such as comprises this invention.

Figure 2 is a front elevational view of the socket portion of the coupling which forms a part of the member adapted to be mounted onto the rear bumper or plate of the hauling vehicle.

Figure 3 is a side elevational view of the coupling in the assembled relation, the same being mounted on the rear bumper of a vehicle, the ball member being attached to the trailer tongue shown in fragmentation.

Figure 4 is a horizontal sectional view of the socket member taken along the lines 4—4 of figure 3, the ball element being eliminated for purposes of clarity.

Figure 5 is a sectional elevational view taken along the line 5—5 of figure 4; and Figure 6 is a view of a modified form of coupling in which the ball member forms a part of the vehicle mounting.

In the illustrated embodiment of the invention 10 designates a motor vehicle having a curvilinear rear bumper 11 secured to the rear of the vehicle and interconnected by the flat guard plate 12. Connected to the rear of the motor vehicle 10 by means of a flexible coupling 13 is a trailer 14 having a trailer draft bar or tongue 15 to which one disengageable portion of the coupling 13 is rigidly attached.

As illustrated, the coupling 13 comprises mating ball 16 and socket 17 members providing an operable joint enabling wide turning movements of one vehicle in relation to the other. Unlike structures heretofore used in this manner, it is more economical to integrate the more complex and costly socket member with the vehicle mounting, thereby to require only one for each vehicle for use with numerous trailers each of which may have the more easily formed ball member securely attached thereto.

An important feature of this invention resides in the means for mounting the socket member 17 onto the rear bumper or plate 11 of the motor vehicle. In this instance a bracket 18a which includes a rectangular metallic plate 18 has a pair of elongate vertical slots 19 formed in the lower lateral edge portions respectively. Bolts arms 20 vertically moveable in each slot 19 have their screw threaded portion 21 extending therethrough for threaded engagement with nuts 22 and 23 disposed on opposite sides of the metallic plate 18. It is manifest that turning movements of either of the nuts 22 or 23 in the direction to loosen same from the metallic plate enables vertical adjustment of the bolt arms in their respective slots, whereafter turning movements of either of the nuts in the direction to abut the metallic plate 18 operates to fasten the bolt arms in the adjusted position.

The amount of horizontal extension of each of the arms 20 may be adjusted merely by operation of bolts 23 and 24 in a simple and obvious manner. The forward end portion of each of the extending bolt arms 20 is turned upwardly to form hooked ends 25 disposed substantially at right angles to the bolt.

A pair of apertures 26 in the upper corners of the metallic plate 18 retain threaded bolt arm members 27 which are adjustable only in the transverse direction upon operation of the securing nuts 28 and 29 having screw threaded engagement therewith on opposite sides of the metallic plate 18. In this instance the end portion of each of the upper bolt arms 26 is downturned to form hooked ends 30 having an angular relation slightly greater than 90° with the bolt arm.

Successful operation of the securing bracket is dependent upon the fact that the lower hook ends 25 are deeper than the upper hook ends 30. Initially, the lower bolt arms 20 are adjusted upwardly to the point where the upper edge 31 of the bumper plate 11 just clears the lower edge of the hook ends 30 when the lower edge 32 of the bumper plate is resting upon the bolt arm 20. Thereafter downward movement of the bracket 18ª in relation to the enclosed bumper plate 11 results in abutment of the upper edge 31 of the bumper plate with the bolt arm 27, the lower edge portion 32 of the bumper plate 11 still being enclosed by the hook ends 25 preventing disengagement between the plate and the bracket.

A set screw 33 having screw threaded engagement with a sleeve 34 formed integrally with the plate 18 is adjustable inwardly to bear against the underside of the bumper plate 11 militating against downward movement in relation thereto, which movement is necessary for subsequent disengagement. It is manifest that operation of the set screw 33 enabling lifting movement of the bracket to the initial raised position permits the bracket to be rocked on or off of the bumper plate 11, enabling assembly or disconnection to be easily made without the use of additional tools or skilled labor. It is to be understood that other means for limiting the relative movement of adjacent elements may be used with equal facility, such means including snap locks or cams.

Ordinarily the bumper plate 11 is curvilinear in form such that engagement between the same and the angularly disposed hook ends 30 provides a gripping action in combination with the abutting and extending reinforcing edge flanges 35 integral with the rectangular plate 18 which tension reduces looseness and rattling noises when in the assembled relation. It is readily understood that when the mounting bracket is used in combination with flat plates or spaced rims, the flanges may be perpendicularly disposed, the set screw 33 merely bearing against the bottom edge portion of the mounted plate to prevent downward movement of the enclosed plate to the dismountable position.

The above describes a universal mounting bracket 18ª which may be adjusted for use with all forms of plates or bumpers. However, modern mass production of vehicles enables standardization of various designs whereby adjustable means are unnecessary enabling the bracket to be produced in specific useable forms by the low cost casting processes.

It is to be understood further, that the described mounting bracket is not limited for use with a trailer coupling, but may be equally applicable for mounting a plate, supporting panel or the like upon a plate or rims having edges in spaced relation. In this instance the mounting bracket having the necessary extending flanges may be assembled merely by raising the bracket until the lower of the spaced edges abuts the bottom arm, whereafter the upper flange is rocked over the upper spaced edge, the subsequent downward or horizontal movement of the bracket results in the encasement of the spaced edges by the attached flanges, whereafter means preventing retrograde movement thereof holds the elements in the assembled relation.

The socket member 17 is integrally connected to the opposite face of the rectangular plate 18 by a web 36 having also a vertical center rib 37 for reinforcing purposes in the direction of greatest stress. Referring specifically to the form as illustrated in Figures 2, 3, 4 and 5, the socket member comprises a spherically shaped scoop having the forward portion 38 and one side portion 39 curvilinear even in the region 40 which extends above the center line of the sphere. The forward inner surface 41 is spherical up to the center line whereafter the remaining portion 42 extends upwardly in a line substantially tangent to the horizontal center line. The other side portion 43 is entirely open, extending flanges 41 being curvilinear as illustrated in Figure 5 but extending laterally substantially parallel to planes tangent to a curvilinear line formed by intersection of the spherical socket at its vertical center. The flanged portion 41 is offset from the socket portion an amount sufficient to permit seating therein of the spherical ball 44 which is connected by a stud 45 to the end of the draft bar 15. Manifestly the spherical base portion, as bounded by the horizontal center line of the socket member 17, is dimensioned to receive the ball 44 with which a bearing fit is continuously maintained while in the assembled relation. The overhanging inner surfaces 40 of the socket member restrict the upward movement of the ball 44 preventing disengagement in that direction. Movement of the ball 44 is only permitted toward the open lateral direction. However, adjustable means are provided for securing the ball in the socket portion when in the draft position. In this instance an angularly shaped rectangular bar 46 is pivoted at one end 47 upon a pin 48 extending through an aperture 49 in the reinforcing web 36. A shoulder 50 extends upwardly from a central portion of the bar 46 and has a threaded aperture 51 therethrough which is engaged by a set screw 52 having one end adapted to abut the rectangular plate 18. It is apparent that when the set screw 52 is turned in a direction to move the end towards engagement with the plate 18, the bar 46 will be rocked horizontally about its vertical pivot to engagement with the exposed edge portion of the positioned ball 44 thereby to prevent lateral movement thereof to the disconnected position. Thus the ball may be securely positioned in the socket portion in a manner to place its center in alignment with the spherical center of the socket whereby all of the forces in operation during draft necessarily must be concentrated along the centers of the mated ball and socket members. Movement of the set screw in the opposite direction permits the arm 46 to be rocked from engagement with the ball 44 opening the lateral passage for disconnection of the ball member.

It is manifest that the shelf flanges 41 permit positive positioning of the ball just prior to the lateral movement seating the same in the socket member 16. It is also to be understood that other means for holding the ball in the draft position may be used with equal facility as the positioning means described.

Figure 6 illustrates a modification of the invention in which the ball 53 is positioned onto the mounting bracket 18 by means of a stud 54 engaging the supporting web 55 integral with the rectangular plate 18. In this instance the socket member is to be mounted on the end portion of the draft bar, as is well understood.

It is manifest that I have produced a mounting bracket which may be positioned onto a member having only spaced edge portions available for fastening purposes. Such brackets are, therefore, adapted for use in connection with the rear bumper plate of an automobile which has an interconnecting guard plate abutting one side thereof.

I have also produced a new and improved ball and socket coupling in which novel positioning and securing means are provided for holding the mating members in alignment whereby the forces are directed along the center of the associated members thereby to comprise a more durable and smoother operating coupling.

It is obvious that the mounting bracket comprises simply formed elements which when adjusted permits effortless mounting and disconnection of the bracket from the spaced rim members. The ball and socket means are also provided with members for expeditious assembly or disassembly of the mating members in the draft position.

It is to be understood that the term rectangular plate 18, as used in the description and the claims, may also include a metallic plate having the intermediate end portion cut away for purposes of reducing the weight of the coupling and the cost of the completed unit. Other changes in the details of construction, arrangement and operation may be effected without departing from the spirit of the invention, especially as defined in the appended claims.

What I claim is:

1. A trailer hitch comprising a vertically disposed plate, vertically spaced oppositely facing hooks on said plate adapted to engage a bumper on the rear end of the towing vehicle, said hooks being spaced in fixed relation to said bumper and to each other whereby movement of said plate in one direction enables one of said hooks to clear the adjacent edge of said bumper permitting said plate to be rocked on or off of said bumper, and movement in the opposite direction causes said hooks to engage said bumper edges with the adjacent face of the bumper abutting said plate, and means on said plate for coupling same to a towed vehicle in which the vertically disposed plate has vertically aligned slots formed in one portion thereof, one group of said hooks being movable therein for vertical adjustment in relation to the other spaced hooks, and means for securing said first hooks in the vertically adjusted position.

2. A trailer hitch comprising a vertically disposed plate, vertically spaced oppositely facing hooks on said plate adapted to engage a bumper on the rear end of the towing vehicle, said hooks being spaced in fixed relation to said bumper and to each other whereby movement of said plate in one direction enables one of said hooks to clear the adjacent edge of said bumper permitting said plate to be rocked on or off of said bumper, and movement in the opposite direction causes said hooks to engage said bumper edges with the adjacent face of the bumper abutting said plate, and means on said plate for coupling same to a towed vehicle, in which portions of said hooks are screw-threaded and insertable through apertures in said vertical plate, nuts disposed on opposite sides of said vertical plate and making threaded engagement with each of said hooks respectively, said nuts permitting transverse adjustment of each of said hooks and also fastening same in the adjusted position.

3. A trailer hitch comprising a vertically disposed plate, vertically spaced oppositely facing hooks on said plate adapted to engage a bumper on the rear end of the towing vehicle, said hooks being spaced in fixed relation to said bumper and to each other whereby movement of said plate in one direction enables one of said hooks to clear the adjacent edge of said bumper permitting said plate to be rocked on or off of said bumper, and movement in the opposite direction causes said hooks to engage said bumper edges with the adjacent face of the bumper abutting said plate, and means on said plate for coupling same to a towed vehicle, in which means are provided for releasably holding said bumper in the engaged position, said means comprising a set screw cooperating with the vertical plate and engaging the bumper for releasably holding the plate against movement in the first direction.

4. A trailer hitch comprising a vertically disposed plate, vertically spaced oppositely facing hooks on said plate adapted to engage a bumper on the rear of the towing vehicle, means for adjusting one of said spaced hooks vertically to a desired position of adjustment whereby the hooks engage said bumper disposed therebetween when said plate is moved in one direction, movement in the other direction enabling one of said hooks to clear said bumper permitting said plate to be rocked on or off of said bumper, means for adjusting the amount of extension of said hooks, means releasably holding said plate against movement from the bumper engaging position, and means on said plate for coupling same to a towed vehicle.

5. A trailer hitch as claimed in claim 4, in which the hooked end portion of one of said hooks is longer than the other whereby movement of said plate in the direction towards the longer flange permits the other flange to clear the adjacent bumper edge by a rocking motion, and means for releasably holding said bumper against movement toward the deeper flange.

6. In combination with a vehicle bumper transversely curved, a trailer hitch, the hitch comprising a flat plate adapted to abut the convex side of said bumper, oppositely arranged hook members on said plate adapted to engage the edge portions of the bumper, one hook member being shorter than the other and inclined at an angle greater than 90° thereby to provide a gripping action in cooperation with said bumper when in the engaged position, and to enable disengagement from said bumper by slight vertical and subsequent rocking movement, and means on said plate for coupling same toward a towed vehicle.

7. In a trailer hitch, a mounting bracket for receiving a vehicle bumper in gripping relation, said mounting bracket comprising a rigid support, oppositely facing hooks in spaced-apart relation on said support enabling the bracket to be shifted between two positions of adjustment when disposed therebetween, one of said hooks being deeper than the other thereby to enable rocking movement of said bracket on or off of the bumper when in one position of adjustment, said hooks blocking movement of said bracket on or off the bumper when in the other position of adjustment, means for adjusting the extension of said hooks from said support, means for adjusting the vertical distance between said hooks, and means cooperating with said bracket and operatively engaging said bumper for retaining said bracket in the gripping relation.

8. A mounting bracket as claimed in claim 7, in which the hooks are vertically spaced with the deeper hooks comprising the lower, one edge portion seating in the lower hook when in the first position of adjustment, while the other edge portion seats on the upper hook in the latter position of adjustment whereby gravitational forces are sufficient as the means for releasably holding the bracket in said latter gripping position.

9. In combination with a vehicle bumper, a trailer hitch, the hitch comprising an upright rigid plate adapted to abut against the bumper, a pair of hooks projecting from one face of said plate with the hooks facing toward each other, one hook being of the order of twice the depth of the other hook and the hooks being rigid relative to said plate and to each other in position of use, the free ends of said hooks being at all times spaced apart a distance less than the height of the bumper and the distance between the bottom of the deeper hook and the free end of the other hook being greater than the height of the bumper, whereby transverse movement of the rigid plate relative to the bumper to dispose the latter in engagement with the bottom of the deeper hook enables the rigid plate and bumper to be separated or engaged by a rocking motion and transverse movement in the opposite direction to dispose the bumper in engagement with the bottom of the shallower hook militating against separation of the rigid plate and bumper, and means on said rigid plate for coupling same to a towed vehicle.

RALPH W. ASKINS.

REFERENCES CITED

The following references are of record in the file of this patent:

UNITED STATES PATENTS

| Number | Name | Date |
|---|---|---|
| 2,060,066 | Goin | Mar. 10, 1936 |
| 2,151,920 | Jandus et al. | Mar. 28, 1939 |
| 2,167,520 | Claude-Mantel | July 25, 1939 |
| 2,214,513 | Thorp et al. | Sept. 10, 1940 |
| 2,250,661 | Thorp ea al. | July 29, 1941 |
| 2,360,643 | Bixel | Oct. 17, 1944 |